United States Patent [19]
Prenger et al.

[11] Patent Number: 5,785,906
[45] Date of Patent: Jul. 28, 1998

[54] METHOD AND DEVICE FOR MANUFACTURING BIAXIALLY ORIENTED TUBING FROM THERMOPLASTIC MATERIAL

[75] Inventors: Jan Hendrik Prenger, Hardenberg; Johan Schuurman, Dedemsvaart; Jan Visscher, Lutten, all of Netherlands

[73] Assignee: Wavin B.V., Zwolle, Netherlands

[21] Appl. No.: 716,406

[22] PCT Filed: Mar. 17, 1995

[86] PCT No.: PCT/NL95/00099

§ 371 Date: Nov. 22, 1996

§ 102(e) Date: Nov. 22, 1996

[87] PCT Pub. No.: WO95/25628

PCT Pub. Date: Sep. 28, 1995

[30] Foreign Application Priority Data

Mar. 22, 1994 [NL] Netherlands .................. 9400452

[51] Int. Cl.⁶ .................................. B29C 47/90
[52] U.S. Cl. .................. 264/40.1; 264/40.5; 264/209.4; 264/209.5; 264/290.2; 425/140; 425/325; 425/384; 425/392
[58] Field of Search ................. 264/290.2, 40.1, 264/40.5, 40.6, 40.7, 209.4, 209.5; 425/140, 325, 384, 392

[56] References Cited

U.S. PATENT DOCUMENTS

| | | | |
|---|---|---|---|
| 2,423,260 | 7/1947 | Slaughter | 264/209.4 |
| 3,296,661 | 1/1967 | Moustier | 264/209.5 |
| 3,812,230 | 5/1974 | Takahshi | 264/89 |
| 4,020,136 | 4/1977 | Zaro | 264/89 |
| 4,028,037 | 6/1977 | Dawson | . |
| 4,314,958 | 2/1982 | Macloed et al. | 264/267 |
| 4,613,532 | 9/1986 | Michel et al. | . |
| 5,096,634 | 3/1992 | Tsadares et al. | . |
| 5,516,270 | 5/1996 | Lehtinen | 425/71 |

FOREIGN PATENT DOCUMENTS

| | | |
|---|---|---|
| 0 087 036 | 2/1983 | European Pat. Off. . |
| 0 441 142 A3 | 1/1991 | European Pat. Off. . |
| 2210657 | 9/1973 | Germany . |
| 384 777 | 1/1988 | Germany . |

*Primary Examiner*—Jan H. Silbaugh
*Assistant Examiner*—Mark Eashoo
*Attorney, Agent, or Firm*—Wigman, Cohen, Leitner & Myers, P.C.

[57] ABSTRACT

A method for manufacturing biaxially oriented tubing from a thermoplastic material. The method includes forcing the tube over a mandrel at an orientation temperature of the plastic material, which mandrel is an expansion part which produces expansion in the circumferential direction of the tube. Downstream of the mandrel an axial pulling force is exerted on the tube, and the biaxially oriented tube is cooled down. At a distance downstream of the mandrel, the tube is drawn through a calibration opening bounded by a calibration device, the calibration opening being such that it produces a reduction in the external dimensions of the tube. Accurate regulation of the external dimensions of the tube is provided by regulating the distance between the mandrel and the calibration device, in particular depending on the external dimensions of the tube measured downstream of the calibration device.

5 Claims, 1 Drawing Sheet

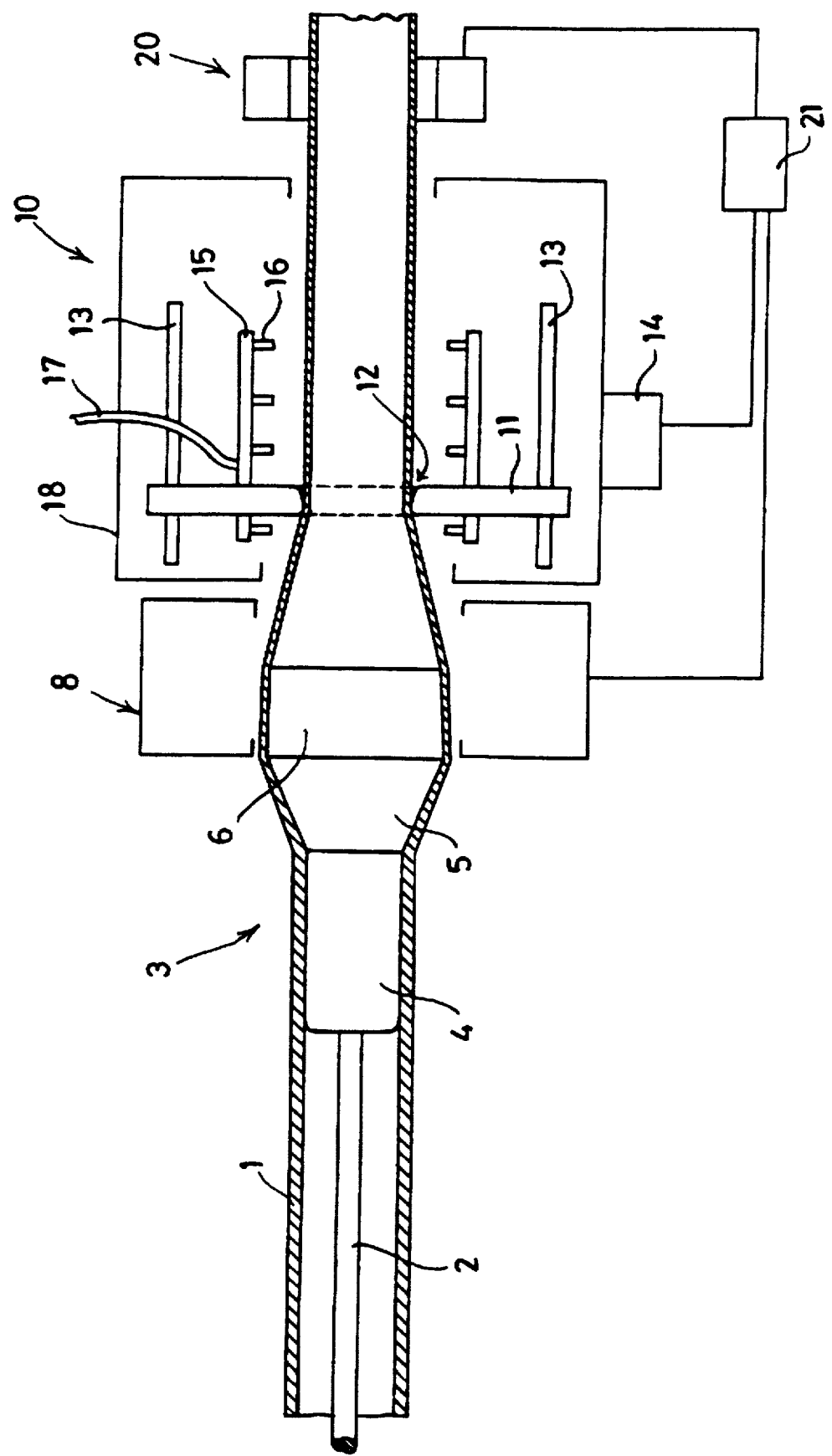

METHOD AND DEVICE FOR MANUFACTURING BIAXIALLY ORIENTED TUBING FROM THERMOPLASTIC MATERIAL

BACKKGROUND OF THE INVENTION

1. Field of the Invention

The present invention relates to a method for manufacturing biaxially oriented tubing from thermoplastic material, comprising forcing the tube over a mandrel at an orientation temperature of the plastic material, which mandrel comprises an expansion part which produces expansion in the circumferential direction of the tube, while downstream of the mandrel an axial pulling force is exerted on the tube, and the biaxially oriented tube is cooled down, and downstream of the mandrel the tube is subjected to calibration of its external dimensions. In the context of the present invention the term tube also relates to hose-type products.

2. Description of the Prior Art

The object of biaxially orienting the plastic material of a tube, also known as biaxially drawing a tube, is to improve the properties of the tube through orientation of the molecules of the plastic material of the tube in two mutually perpendicular directions. In the case of a certain known method the biaxial orientation is produced by forcing the tube over a mandrel, with the result that the tube is deformed. Upstream of the mandrel the tube is brought to a suitable orientation temperature. In practice, the temperature distribution inside the tube wall is within a suitable range for biaxial orientation of the molecules of the plastic material of the tube.

In the case of the known method the tube is forced over the mandrel through an axial pulling force being exerted on the tube downstream of the mandrel. The mandrel comprises an expansion part which produces the increase in the dimensions in the circumferential direction of the tube. The fact that the tube passes over this expansion part essentially determines the orientation of the plastic material in the circumferential direction of the tube. The axial pulling force essentially determines the orientation in the axial direction. The biaxial orientation obtained is fixed (frozen) by cooling down the tube.

A method of the type mentioned in the preamble is known from, for example, WO 93/19924. This publication describes how a tube with a cylindrical tube wall is manufactured by means of an extruder. Viewed in the direction of movement of the tube, a solid, undeformable mandrel with a conical expansion part is situated downstream of said extruder. The tube is forced over the mandrel at an orientation temperature which is suitable for the plastic material concerned, through an axial pulling force being exerted on the tube downstream of the mandrel. At the level of a run-off part of the mandrel, connected to the expansion part of the mandrel, the tube is cooled externally in order to fix the orientation obtained.

In order to guarantee that the ultimately manufactured biaxially oriented tube has the desired external dimensions—in this case external diameter—with sufficient accuracy, this publication proposes that a vacuum calibration sleeve should be placed downstream of the mandrel, between the mandrel and the pulling device. The tube is pulled through this calibration sleeve, in the course of which the tube is sucked against the inside wall of the calibration sleeve by means of a vacuum created by a vacuum source. The result of this is that the tube is stretched here in the circumferential direction until it reaches an external diameter determined by the inside wall of the calibration sleeve. In order to make stretching of the tube possible, the tube has to be heated in the case of this known method. The heating is carried out by heating the calibration sleeve.

The method of calibration of the external dimensions of the biaxially oriented tube proposed in the case of this known method has proved disadvantageous. In particular, it has been found that the biaxial orientation of the plastic material of the tube produced during the passage over the mandrel is impaired in an undesirable way, both through increasing the external dimensions of the tube during calibration and through heating applied to the tube during the calibration.

The object of the present invention is to eliminate the abovementioned disadvantage and also to provide a method which comprises accurate regulation for the external dimensions of the tube.

SUMMARY OF THE INVENTION

This object is achieved by a method of the type described in the preamble, which is characterized in that at a distance downstream of the mandrel the tube is drawn through a calibration opening bounded by calibration means, the calibration opening being such that it produces a reduction in the external dimensions of the tube. The calibration means can be in the form of, for example, a solid draw plate with a calibration opening formed therein or a number of rollers which together bound the calibration opening.

In this respect it is important to recognize that the tube will shrink downstream of the mandrel through cooling, in particular produced by cooling means set up at that point. This shrinkage occurs both in the case of the method according to the present invention and in the case of the methods already known. In order to produce the effective reduction in the external dimensions of the tube envisaged according to the present invention, the reduction must therefore lead to smaller external dimensions than the external dimensions which the tube would acquire if allowance is made for the shrinkage which occurs.

Unlike the above-described known method, the calibration means produce a reduction in the external dimensions of the tube. Since a reduction in the external dimensions now occurs, it is not necessary for the tube and/or the calibration means to be heated, which is advantageous for achieving the envisaged biaxial orientation.

In the case of the method according to the invention the cross-section of the tube undergoes a progressive reduction between the mandrel and the calibration opening. The way in which said reduction occurs here, in particular the speed at which it occurs, can advantageously be used for controlling the biaxial drawing process, as will emerge from the sub-claims and the corresponding description.

The tube also encounters a resistance at the moment when it is passing through the calibration means. This resistance can also advantageously be used for controlling the biaxial drawing process.

It is pointed out that European Patent Application EP 0157601 discloses a method of the type mentioned in the preamble in which, downstream of the expansion part of the mandrel, the tube to be oriented is drawn through a draw plate lying around a cylindrical run-off part of the mandrel. It is clear that this draw plate does not serve as a calibration means for the external dimensions of the tube after the tube has left the mandrel, as in the case of the present invention. On the contrary, EP 0157601 discloses an interaction between the draw plate and the part of the mandrel lying inside it for producing the biaxial orientation of the plastic material of the tube.

In the case of the method according to the present invention the distance between the mandrel and the calibration opening is regulated. For this purpose, it is, of course, necessary for the calibration means to be movable relative to the mandrel, which is simple to carry out.

The distance between the mandrel and the calibration opening is regulated depending on the external dimensions of the biaxially oriented tube measured downstream of the calibration opening.

The distance between the mandrel and the calibration opening is advantageously increased if the measured external dimensions of the biaxially oriented tube are smaller than the desired external dimensions, and the distance between the mandrel and the calibration opening is reduced if the measured external dimensions of the biaxially oriented tube are greater than the desired external dimensions.

In an advantageous embodiment of the method according to the invention the calibration means are cooled. The tube is also preferably cooled further when it is downstream of the calibration means. The influence of the shrinkage of the tube caused by this cooling on the external dimensions of the tube can be determined (for example, experimentally) and used in determining or adjusting the dimensions of the calibration opening, which are necessary to obtain the desired external dimensions of the tube.

In a variant of the method according to the present invention, downstream of the mandrel the tube is drawn through several calibration openings placed one after the other and bounded by calibration means, each calibration opening being such that it produces a further reduction in the external dimensions of the tube. This means that the reduction per passage through a calibration opening is limited, which in a number of cases is advantageous as regards the influence of said reduction on the biaxial orientation achieved in the case of the mandrel.

BRIEF DESCRIPTION OF THE DRAWING

The invention will be explained in greater detail below with reference to the single FIG. 1 of the drawing, in which in a top view the part of the exemplary embodiment of a device according to the invention for manufacturing biaxially oriented tubing which is relevant for explaining the invention is shown.

DESCRIPTION OF THE PREFERRED EMBODIMENT

The drawing is based on an application in which a tube with a smooth cylindrical wall is manufactured from thermoplastic material. It will be clear that the inventive idea and solutions described here can also be used for the manufacture of tubular sections of a different cross-section, if necessary by adapting the embodiment of the solutions described herein.

The drawing shows a part of a tube 1 (in longitudinal section) made of thermoplastic material, which tube is manufactured in a continuous process by means of an extruder (not shown). Downstream of the extruder the plastic material of the tube 1 is brought by means of temperature-regulating means (not shown) to a temperature suitable for biaxial orientation, for example cooling by air or water.

The plastic material of the tempered tube 1 is biaxially oriented (drawn) by subsequently forcing the tube 1 over a metal mandrel 3 fixed by a tension member 2 to the extruder. The mandrel 3 has a cylindrical run-on part 4, a conical expansion part 5 and a slightly tapered run-off part 6.

For forcing the tube 1 over the mandrel 3 a pulling device (not shown) is present downstream of the mandrel 3, for exerting an axial pulling force on the tube 1. A pushing device may also be placed upstream of the mandrel 3, for exerting a pushing force on the tube 1.

In order to fix the biaxial orientation of the molecules of the plastic material of the tube 1 during the passage over the mandrel 3, the tube is subjected to external cooling downstream of the expansion part 5 of the mandrel 3. For this purpose, a diagrammatically indicated cooling device 8 is set up at this point, for example with spray nozzles for cooling water.

At a distance downstream from the mandrel 3, there is a calibration and cooling device 10 according to the invention, which will be explained below. The calibration and cooling device 10 comprises a draw plate 11, in the form of a metal disc with a central calibration opening 12. The draw plate 11 is slidably mounted on guide bars 13 of the fixed frame of the calibration device 10, in such a way that the distance between the draw plate 11 and the mandrel 3 can be set within a suitable range. The calibration device 10 comprises a diagrammatically indicated displacement unit 14 for moving the draw plate 11.

Arms 15 with cooling medium spray nozzles 16 are fixed to the draw plate 11, for cooling the biaxially oriented tube 1 during and after its passage through the draw plate 11. The cooling medium, for example water, is supplied through a pipe 17 to the spray nozzles 16. The cooling medium is collected in a tank 18 placed around the calibration and cooling device 10.

The diameter of the calibration opening 12 of the draw plate 11 is selected in such a way that the external diameter of the tube 1 is reduced when it is passing through the draw plate 11. The reduction which the draw plate 11 produces in the external diameter relative to the external diameter of the tube 1 at the moment of leaving the mandrel 3 is greater than the reduction in the external diameter of the tube 1 resulting from the shrinkage through cooling of the tube in the path between the mandrel 3 and the calibration opening 12. In other words, the draw plate 11 exerts an effective force on the tube 1, thereby reducing the external diameter of the tube 1. By making an allowance for further shrinkage of the tube 1 after it leaves the calibration opening, the diameter of said calibration opening 12 can be selected in such a way that the ultimately manufactured tube 1 acquires the envisaged external diameter with great accuracy.

The present invention provides a solution to effectively controlling the external diameter of the biaxial oriented tube 1. To this end, a diagrammatically shown measuring device 20 is placed downstream of the calibration device 10. This measuring device 20 measures the external dimensions, in this case the external diameter, of the tube 1. The measuring device 20 transmits a signal representing the external dimensions to a control unit 21, which compares this signal with a signal representing the desired external dimensions of the tube 1. A control signal based on the difference between these two signals is supplied by the control unit 21 to the displacement unit 14 of the calibration device 10. This produces the movement of the draw plate 11 relative to the mandrel 3. If it is found by the control unit 21 that the external diameter of the tube is smaller than the desired external diameter, the control unit 21 transmits such a signal to the displacement unit 14 that the distance between the mandrel 3 and the draw plate 11 increases. However, if the external diameter of the tube 1 is greater than the desired external diameter, the draw plate 11 is moved towards the mandrel 3.

The basic principle of this method can be explained by the speed at which the cross-section of the tube is reduced. This speed depends on the distance between mandrel 3 and draw plate 11. If the speed of reduction of the cross-section is relatively great, the ultimate diameter reduction is found to be greater than that at a lower speed (a great distance between the mandrel and the draw plate).

The resistance formed by the draw plate 11 to the tube 1 passing through it can also be used advantageously for the biaxial orientation to be achieved. Although this orientation occurs essentially when the tube 1 is passing over the mandrel 3, it is found that the axial tension in the tube 1 in the path after it has passed through the draw plate 11 has an influence on the ultimately manufactured tube 1. In particular, the cooling of the tube can be regulated suitably by means of the cooling device 8 so that the biaxially oriented tube 1 is cooled in the path between the mandrel 3 and the draw plate 11. This then leads to an increase in the resistance formed by the draw plate 11 to the tube 1 passing through it. This change in the resistance, combined with the pulling force exerted on the tube 1, leads to a change in the axial tension in the tube 1. This method of changing the axial tension in the tube 1 can advantageously be used for obtaining the envisaged biaxial orientation.

We claim:

1. Method for manufacturing biaxially oriented tubing from a thermoplastic material comprising the steps of:

providing a tube of thermoplastic material with an orientation temperature of the thermoplastic material;

forcing said tube over a mandrel;

said mandrel having an expansion part for producing expansion in a circumferential direction of said tube which essentially determines a circumferential orientation of the thermoplastic material in the circumferential direction of said tube;

applying an axial pulling force downstream of the mandrel to said tube to produce an axial orientation of said thermoplastic material in an axial direction of said tube, cooling said tube and fixing a biaxial orientation of said thermoplastic material, said circumferential orientation and said axial orientation comprising said biaxial orientation, wherein downstream of the mandrel said tube is drawn through a calibration opening bounded by calibration means to reduce an external dimension of said tube; and measuring the external dimension of said tube downstream of said calibration opening and regulating the distance between said mandrel and said calibration opening depending on external dimensions of said tube measured downstream of said calibration opening to yield a desired external dimension of said tube.

2. Method according to claim 1, wherein said calibration means are cooled.

3. Method according to claim 1, wherein downstream of said mandrel said tube is drawn through multiple calibration openings placed one after the other and bounded by calibration means, each calibration opening being such that it produces a further reduction in the external dimensions of said tube.

4. Method according to claim 1, wherein said tube is cooled upstream of the calibration means.

5. Method according to claim 1, wherein said distance between said mandrel and said calibration opening is increased if said external dimensions of said tube as measured downstream of said calibration opening are smaller than desired external dimensions, and wherein said distance between said mandrel and said calibration opening is reduced if said external dimension of said tube measured downstream of said calibration opening are greater than the desired external dimensions.

* * * * *